Dec. 9, 1952  B. J. KARCZ  2,620,659
THERMAL METERING APPARATUS
Filed June 5, 1950  2 SHEETS—SHEET 1

Inventor
Bruno J. Karcz
by Roberts Cushman & Grover
Att'ys.

Dec. 9, 1952
B. J. KARCZ
2,620,659
THERMAL METERING APPARATUS
Filed June 5, 1950
2 SHEETS—SHEET 2
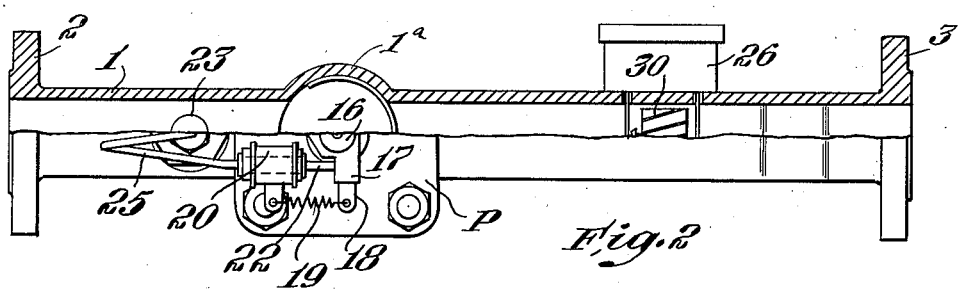
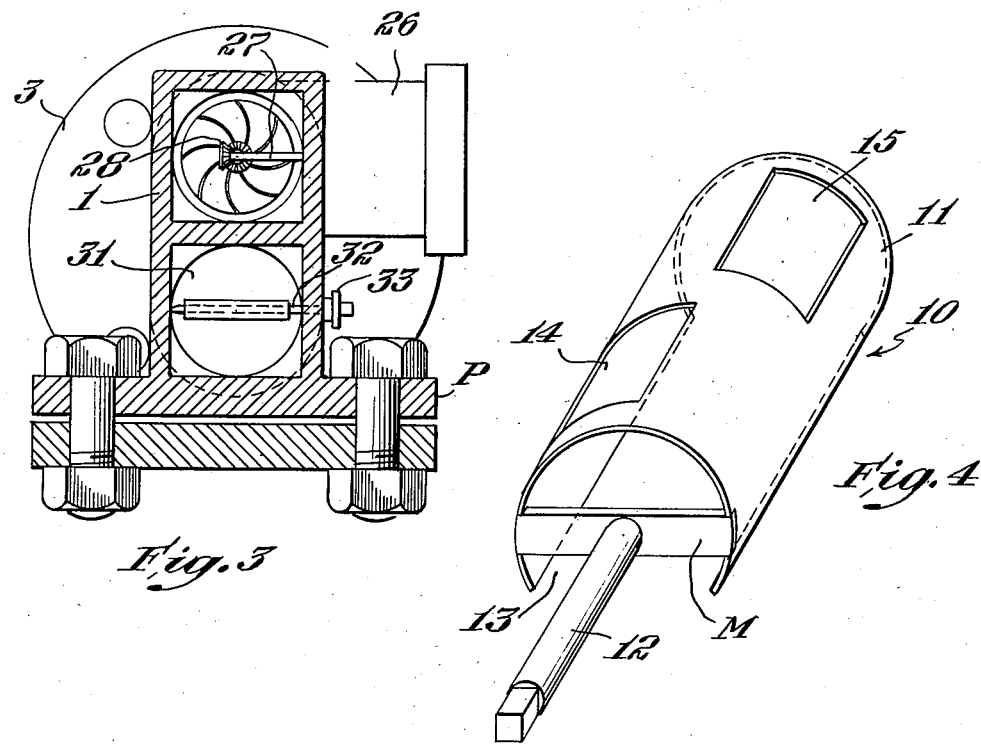
Inventor
Bruno J. Karcz
by Roberts Cushman & Grover
att'ys.

Patented Dec. 9, 1952

2,620,659

UNITED STATES PATENT OFFICE 2,620,659

THERMAL METERING APPARATUS

Bruno J. Karcz, Post Nesselwang, Germany, assignor to George B. Karcz, East Weymouth, Mass.

Application June 5, 1950, Serial No. 166,252
In Germany June 11, 1949

3 Claims. (Cl. 73—193)

This invention pertains to metering apparatus for measuring the quantity of heat in a flowing fluid. Such metering apparatus is of utility, for example, in determining the charge to be made for water which is supplied to the user at an elevated temperature. For specific instance, it is customary, in certain localities, to charge the individual tenant in an apartment house for the hot water furnished by the landlord; since both the volume and the degree of heat are factors involved in the adequacy of the service, the charge made for such service is a frequent cause of disagreement between landlord and tenant.

The present invention has for its principal object the provision of a metering device which automatically measures and records (with the degree of accuracy common to usual water metering devices) the actual quantity of heat supplied, for example as expressed in thermal (B. t. u.) units. A further object is to provide a thermal metering device which is simple in construction and relatively easy and inexpensive to manufacture; which is rugged and requires a minimum of attention and which does not substantially interfere with the flow or reduce the pressure of the fluid being metered. Other and further objects and advantages of the invention will be pointed out in the following, more detailed, description and by reference to the accompanying drawings wherein Fig. 1 is a vertical longitudinal section through the casing of the apparatus showing the interior construction;

Fig. 2 is a bottom plan view, partly in horizontal section;

Fig. 3 is a section, to larger scale, on the line 3—3 of Fig. 1;

Fig. 4 is a perspective view, to large scale, showing the proportioning valve;

Figure 1:
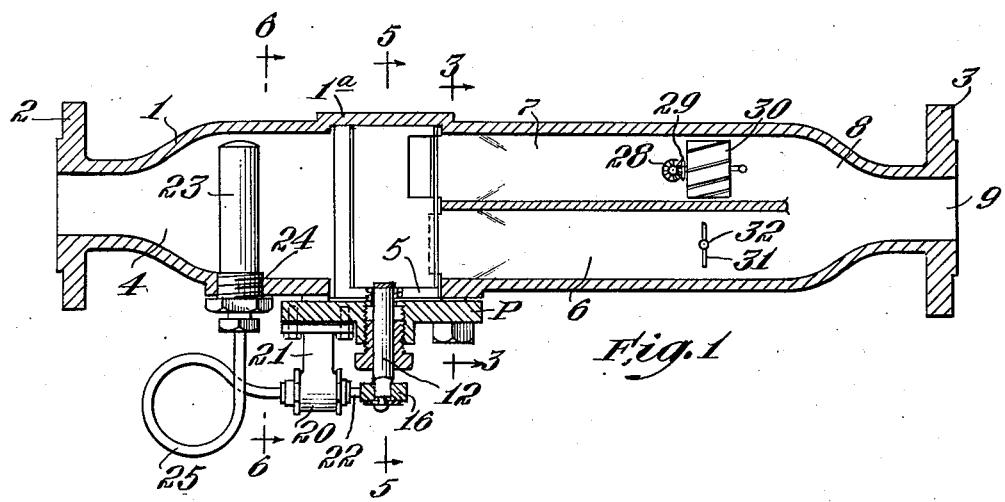

Referring to the drawings, the numeral 1 designates the casing of the apparatus, this casing being a casting or otherwise constructed and having attaching flanges 2 and 3 at its opposite ends by means of which suitable pipe connections may be attached for supplying and conveying away the fluid. As shown in Fig. 1, the left-hand end portion of the casing is shaped to provide the inlet chamber 4. To the right of this chamber, the casing is shaped at 1ª to provide the cylindrical valve chamber 5, the latter communicating freely with the chamber 4 and at times communicating with one or the other of two longitudinally extending passages 6 and 7 which merge at 8 at the entrance to the outlet passage 9.

Within the valve chamber 5 there is arranged a proportioning valve 10 (Fig. 4) here shown as comprising a cylindrically curved shell 11 which may, for example, be of sheet metal or the like, this shell being open at one side, from top to bottom as shown at 13, so that the interior of this valve casing is always in communication with the inlet chamber 4. A transverse bar M connects the opposite sides of the shell at its lower end. The valve shell 11 has windows 15 and 14 at its upper and lower portions, respectively, these windows being offset circumferentially from each other and so arranged that when the window 15, for example, is aligned with the passage 7, the window 14 is not aligned with the passage 6, and vice versa.

Figures 5, 6:
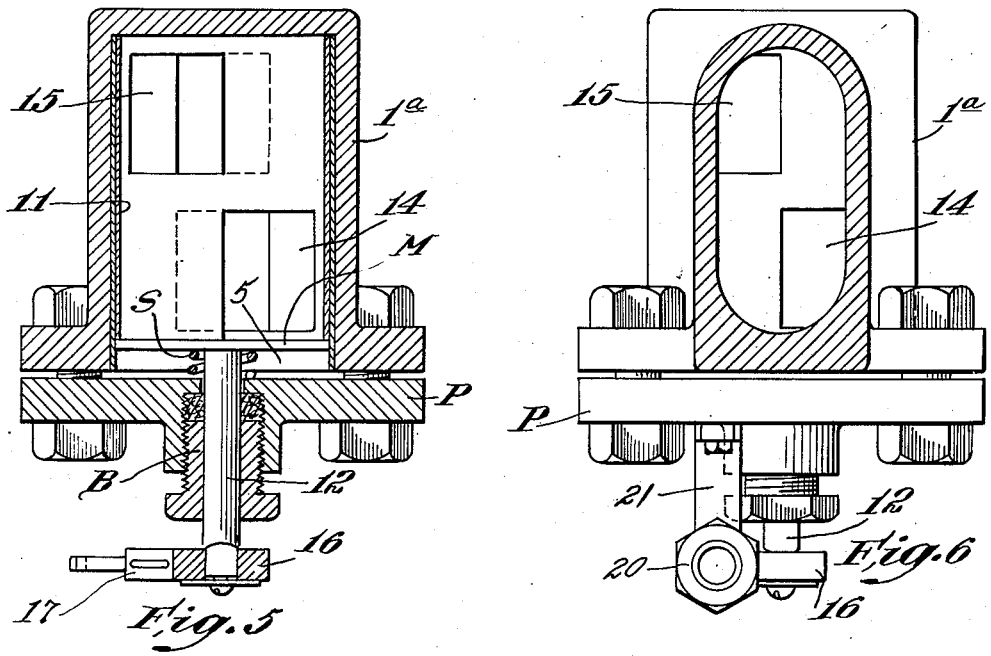
Fig. 5 is a section on the line 5—5 of Fig. 1.
Fig. 6 is a section on the line 6—6 of Fig. 1.

The valve shell 11 is carried by an axial shaft 12 which turns in a bearing bushing B (Fig. 5) removably secured in a central opening in a plate P which is bolted to the casing 1 immediately below the valve chamber 5. A spring S (Fig. 5) interposed between the upper surface of the plate P and the bar M urges the valve shell 11 upwardly in the valve chamber so as to keep the upper edge of the shell 11 in contact with the upper wall of the valve chamber.

At its lower end the stem 12 of the valve is provided with a collar 16 (Fig. 5) from which extends a crank arm 17 (Fig. 2). A finger 18 extends from the end of the crank arm and to this finger one end of a tension spring 19 is attached, the other end of the spring being secured to a suitable fixed support so that the spring tends to turn the crank arm 17, and thus to rotate the valve stem in a clockwise direction, as viewed in Fig. 2.

A motor cylinder 20 (Fig. 1), having an attaching bracket 21, is secured to the underside of the plate P. Within this motor cylinder there is arranged a piston (not shown) having a rod 22 whose outer end bears against the crank arm 17 so that when the piston moves to the right, as viewed in Figs. 1 and 2, the piston rod tends to turn the crank arm in opposition to the spring 19.

Within the inlet chamber 4 there is arranged a thin-walled capsule 23 (Fig. 1), for example, of thin metal or other good heat-conducting material, this capsule having a screw threaded portion 24 having threaded engagement with an opening in the wall of the inlet chamber 4. The interior of the capsule 23 communicates, by means of a connecting tube 25, with the space in the motor cylinder 20 to the left of the piston. The capsule 23 and the connecting tube 25 are filled with a fluid having a very high coefficient of thermal expansion. For example this fluid may be a highly volatile liquid such as benzol or, if preferred, it may be a substance which is normally in gaseous condition at the lowest temperature which the apparatus is designed to measure, for example, ammonia gas.

A meter housing 26 is secured to the casing 1, being integral with the latter if desired. This meter housing contains suitable indicating and recording means, for example, such as is customary in water meters, but with its dial graduated to indicate thermal units of liters. This metering mechanism may be of any usual conventional construction, having a shaft 27 which passes through an opening in the wall 1 of the casing and which is provided with a beveled gear 28 (Fig. 1) at its inner end. This bevel gear meshes with a bevel gear 29 on a shaft which carries a rotor 30 arranged within the passage 7. The rotor is of the kind which is customarily used in water metering apparatus and is designed to be turned by the fluid flowing through the passage 7 (here referred to as the measuring passage or channel) and to turn proportionately to the volume of fluid passing.

Within the passage 6 (here referred to as the by-pass channel or passage) there is preferably arranged an adjustable baffle member 31 mounted on a shaft 32 which extends out through the wall of the casing and which is provided outside the casing (Fig. 3) with adjusting and locking means 33 whereby the baffle 31 may be set and held fixed in desired position of adjustment.

The operation of the apparatus is in brief as follows, it being assumed that the casing 1 is connected to a supply pipe and delivery pipe and that water is entering the chamber 4 at the lowest temperature (50° F.) of the range which is to be measured. When the water is at this temperature, the expansible material in the capsule 23 is contracted sufficiently so that the spring 19 is able to swing the crank arm 17 and thus turn the valve stem 12 until the valve shell 11 occupies a position in which the window 15 is fully closed and the window 14 is fully open. With this arrangement all the liquid which enters the chamber 4 must flow through the by-pass passage 6 and so on out through the passage 9, and the rotor 30 remains at rest. This condition continues until the temperature of the water rises slightly above 50° F., whereupon temperature recording will begin. As soon as the temperature rises above 50° F., even to a fraction of a degree, the fluid in the capsule 23 begins to expand and thus turns the valve stem 12 so as slightly to open the window 15 and at the same time to begin to close the window 14. Some of the liquid now flows through the passage 7 and in doing so, turns the rotor 30. The meter 26 now begins to measure the liquid flowing from the passage 7 and to record it in terms of heat units. As the temperature of the incoming water increases, the window 15 is opened more and more fully, and the window 14 is closed more and more, until eventually, at the highest liquid temperature, the window 14 will be fully closed and all of the liquid will be passing through the passage 7, and the rotor 30 will be turning at maximum speed and the meter will record the amount of heat in thermal units.

The following calculations show that it is practical to graduate the meter in thermal units even though the rotor of the meter is responsive directly to the volume of fluid flowing past it.

In computing the temperature of water delivered to users it is customary to consider 50° F. as the minimum temperature of the water to be delivered. It requires 8.36 B. t. u. to warm one gallon of water through 1° F. It may be assumed that the thermal metering apparatus of the present invention is designed to work within a range from 50° F. to 194° F. and that at 50° F. the measuring flow passage is closed completely while the other or by-pass passage is wide open. It is further assumed that for each 1° F. rise in temperature in the inlet chamber the measuring flow passage will be opened by 0.7% while the by-pass passage will be closed to the same amount. It is further assumed that the meter has an impulse wheel or rotor which makes 600 revolutions for each gallon of water flowing through the passage.

With the above assumptions, if the water in the inlet chamber is at 68° F. the added temperature will be 68—50 or 18° F., which means that the measuring channel will be opened by the motor device 18×0.7 or 12.6 Thus for each gallon of water which passes through the inlet chamber and is delivered through outlet 9, 0.126 gallon of water will flow through the measuring channel, which means that the rotor will make 75.6 revolutions. Since the B. t. u. content of this gallon of water has been increased 18×8.36=150 B. t. u.'s and since the rotor makes 75+ revolutions in delivering this quantity of heat, the rotor will indicate the delivery of approximately 2.0 B. t. u.'s for each revolution.

Now if the temperature of the inlet water rise to 122° F. the added temperature will be 122—50=72. Then the measuring channel will be opened 72×0.7 or 50%, which means that 0.5 of the gallons of water will flow through the measuring channel. This means that the rotor of the meter will make 300 revolutions, but since this corresponds to 72×8.36=602 B. t. u.'s, the B. t. u.'s indicated per revolution of the rotor will be approximately 2.0 as before. Again if the initial temperature of the water be 194° F. the added temperature will be 194—50=144. This will correspond to a 100% opening of the measuring channel and under this condition the rotor of the meter will make 600 revolutions. This corresponds to a delivery of 1203 B. t. u.'s at the outlet 9 which again means that approximately 2.0 B. t. u.'s are indicated for each revolution of the rotor.

It is thus evident that the meter may readily be graduated so as to read directly in B. t. u.'s delivered. Since water meters of the type employed, using rotors responsive to the volume of flow, customarily work within an error of 3%, the quantity of heat supplied may readily be determined within this per cent error.

The baffle 31 is so set and held in adjusted position as to provide substantially the same amount of resistance to fluid flow within the passage 6, as is offered to the fluid flow in the passage 7 by the rotor 30 and associated parts, thus providing for accuracy of reading the instrument, whether all of the liquid is flowing through the passage 7 or only a part of it is flowing through the passage 7 and a part through the passage 6.

While one desirable embodiment of the invention has been shown and described by way of example, it is to be understood that the invention is broadly inclusive of any and all modifications falling within the scope of the appended claims.

I claim:
1. Thermal metering apparatus comprising a casing having an inlet chamber, means defining two flow passages leading from said chamber, means defining a valve chamber having a rotary valve provided with passages operative, at times, to provide communication between the inlet chamber and the respective flow passages, a rotary shaft on which the valve is mounted, a meter having a rotor disposed within one of said flow passages and which turns according to the volume of fluid flowing through said passage, said meter being graduated in thermal units and having indicating means which is moved by the rotor, a rigid container for thermally expansible fluid arranged within the inlet chamber, a cylinder having therein a piston, a piston rod fixed to the piston, motion-transmitting means operative to turn the valve shaft in response to movement of the piston rod, means providing communication between the container in the inlet chamber and the cylinder whereby the piston is caused to move and thereby turn the valve shaft in response to rise in temperature in the fluid in the inlet chamber, a spring mounted adjacent said motion transmitting means and connected to the valve shaft tending to turn the valve shaft in the opposite direction, and a manually adjustable rotary baffle in the other of said fluid flow passages operative to offer a resistance to fluid flow in said passage substantially equal to the resistance to flow offered by the rotor of the meter.

2. Thermal metering apparatus comprising a casing having an inlet chamber, means defining two flow passages leading from said chamber, means defining a cylindrical valve chamber, a cylindrically curved shell within the valve chamber, said shell being rotatable about the axis of the chamber and being open at one side, substantially from end to end, whereby the interior of the shell is always in communication with the inlet chamber, the shell having windows at its opposite side adjacent to its opposite ends respectively, the windows being offset circumferentially and so arranged that when one window is aligned with one of the flow passages the other window is out of alignment with the other flow passage, a meter having a rotor disposed within one of said fluid flow passages and which turns according to the volume of fluid flowing through the passage, the meter being graduated in thermal units and having indicating means which is moved by the rotor, a container for expansible fluid arranged within the inlet chamber, a pressure motor having a movable part, motion-transmitting means operative to transmit motion from said movable motor part to the cylindrical shell thereby to turn the latter in response to rise in temperature in the fluid in the inlet chamber, resilient means mounted adjacent said motion transmitting means and connected to the cylindrical shell tending to turn the cylindrical shell in the opposite direction, and a manually adjustable baffle in the other of said fluid flow passages operative, when adjusted, to offer a resistance to a fluid flow in said latter passage equal to the resistance to flow offered by the rotor of the motor.

3. Thermal metering apparatus comprising a casing having an inlet chamber, means defining two flow passages, a valve chamber having therein a rotary valve provided with passages operative at times to provide communication between the inlet chamber and the respective flow passages, said valve having a shaft provided with a crank arm, a meter having a rotor disposed within one of said fluid flow passages and which turns according to the volume of fluid flowing through the passage, said meter being graduated in thermal units and having indicating means which is moved by the rotor, a container for thermally expansible fluid arranged within the inlet chamber, a pressure motor having a movable part operative to actuate the crank arm on the valve shaft, means providing communication between the container in the inlet chamber and the motor whereby the movable element of the motor is caused to move and thereby turn the valve shaft in response to rise in temperature in the fluid in the inlet chamber, a spring tending to turn the valve shaft in the opposite direction, and an adjustable baffle in the other of said fluid flow passages operative to offer a resistance to fluid flow in said latter passage equal to the resistance to flow offered by the rotor of the meter.

BRUNO J. KARCZ.

REFERENCES CITED

The following references are of record in the file of this patent:

UNITED STATES PATENTS

| Number | Name | Date |
|---|---|---|
| 915,506 | Sweet | Mar. 16, 1909 |
| 1,411,165 | Covert | Mar. 28, 1922 |
| 1,642,296 | Brant | Sept. 13, 1927 |
| 2,049,197 | Davies et al. | July 28, 1936 |

FOREIGN PATENTS

| Number | Country | Date |
|---|---|---|
| 264,016 | Switzerland | July 1, 1950 |
| 469,669 | Germany | Dec. 19, 1928 |